United States Patent [19]

Bortz

[11] Patent Number: 5,989,375
[45] Date of Patent: Nov. 23, 1999

[54] FRICTION CONTROLLING DEVICES AND METHODS OF THEIR MANUFACTURE

[76] Inventor: David N. Bortz, 2400 Woodmere Dr., Cleveland Heights, Ohio 44106

[21] Appl. No.: 08/471,746

[22] Filed: Jun. 6, 1995

Related U.S. Application Data

[62] Division of application No. 08/210,072, Mar. 17, 1994, abandoned, which is a continuation of application No. 07/691,672, Apr. 25, 1991, abandoned, which is a continuation of application No. 07/361,741, Jun. 1, 1989, abandoned, which is a continuation of application No. 06/781,190, Sep. 25, 1985, abandoned, which is a continuation of application No. 06/598,357, Apr. 11, 1984, abandoned, which is a continuation of application No. 06/105,893, Dec. 21, 1979, abandoned.

[51] Int. Cl.⁶ .............................. D04H 1/48; F16D 69/00
[52] U.S. Cl. ................ 156/148; 188/251 A; 442/136; 442/148; 442/402
[58] Field of Search ................ 188/251 A; 156/148, 156/149; 428/65.9; 442/136, 148, 402

[56] References Cited

U.S. PATENT DOCUMENTS

| | | |
|---|---|---|
| 2,733,797 | 2/1956 | Almen . |
| 2,733,798 | 2/1956 | Almen . |
| 2,862,283 | 12/1958 | Rasero . |
| 2,875,474 | 3/1959 | Lauterbach . |
| 2,901,388 | 8/1959 | Morton . |
| 3,270,846 | 9/1966 | Arledter . |
| 3,271,231 | 9/1966 | Moggio . |
| 3,365,041 | 1/1968 | Stormfeltz .......................... 188/251 A |
| 3,429,766 | 2/1969 | Stormfeltz ............................... 156/169 |
| 3,508,307 | 4/1970 | Dilo .......................................... 28/110 |
| 3,635,158 | 1/1972 | Budinger ................................ 101/425 |
| 3,878,316 | 4/1975 | Groff ...................................... 428/288 |
| 3,950,599 | 4/1976 | Boerd . |
| 3,952,121 | 4/1976 | Dilo ........................................ 156/148 |
| 4,031,283 | 6/1977 | Fagan ..................................... 428/300 |
| 4,045,608 | 8/1977 | Todd . |
| 4,054,337 | 10/1977 | Matt . |
| 4,107,125 | 8/1978 | Lovejoy . |
| 4,130,537 | 12/1978 | Bohrer ..................................... 428/273 |
| 4,219,452 | 8/1980 | Littlefield .............................. 88/251 A |
| 4,282,283 | 8/1981 | George .................................... 428/292 |
| 4,291,087 | 9/1981 | Warburton ............................. 428/288 |
| 4,320,823 | 3/1982 | Covaleski ............................... 428/323 |
| 4,384,640 | 5/1983 | Trainor et al. ......................... 428/257 |

FOREIGN PATENT DOCUMENTS

| | | |
|---|---|---|
| 2727541 | 1/1979 | Germany . |
| 2000517 | 1/1979 | United Kingdom ................... 523/156 |
| 2012671 | 8/1979 | United Kingdom . |

OTHER PUBLICATIONS

Union Oil Company Advertisement, Applying Advanced technology to high Loft non–wovens—Nonwovens Industry, May 1978.

Process Converts Teflon Resins Into Inert, Porous Fibrous Material Project Engineering, Sep. 1973.

Fibrous, Porous TFE Provides Dimensional Stability for High Temperature . . . Insulation Circuits, Jun. 1971.

Chemplast ZITEX Porous TFE Membrane Products Filtration Engineering Catalog –undated.

Chemplast Membranes of ZITEX for Growing Crystals, undated.

Improved Dispersions of Keular Aramid Fiber, Research Disclosure, Oct. 1979, No. 18605.

Vaughn D.J., The use of Coupling Agents to Ehance the Performance of Aramid Reinforced Composites, Poly. Eng. Sci 167–169 (78).

Vaughn D.J., Coupling Agents for Use in Aramid Reinforced Composites, Modern Plas, pp. 66–67—Oct. 1977.

*Primary Examiner*—Daniel Stemmer
*Attorney, Agent, or Firm*—Watts Hoffmann Fisher & Heinke

[57] ABSTRACT

Wear resistant devices and methods of their manufacture in which the intended function or result of the devices is to influence operational coefficients of friction. The devices are made of fiber-reinforced polymer composite materials produced by nonwoven textile and plastics industries' materials and methods.

10 Claims, 1 Drawing Sheet

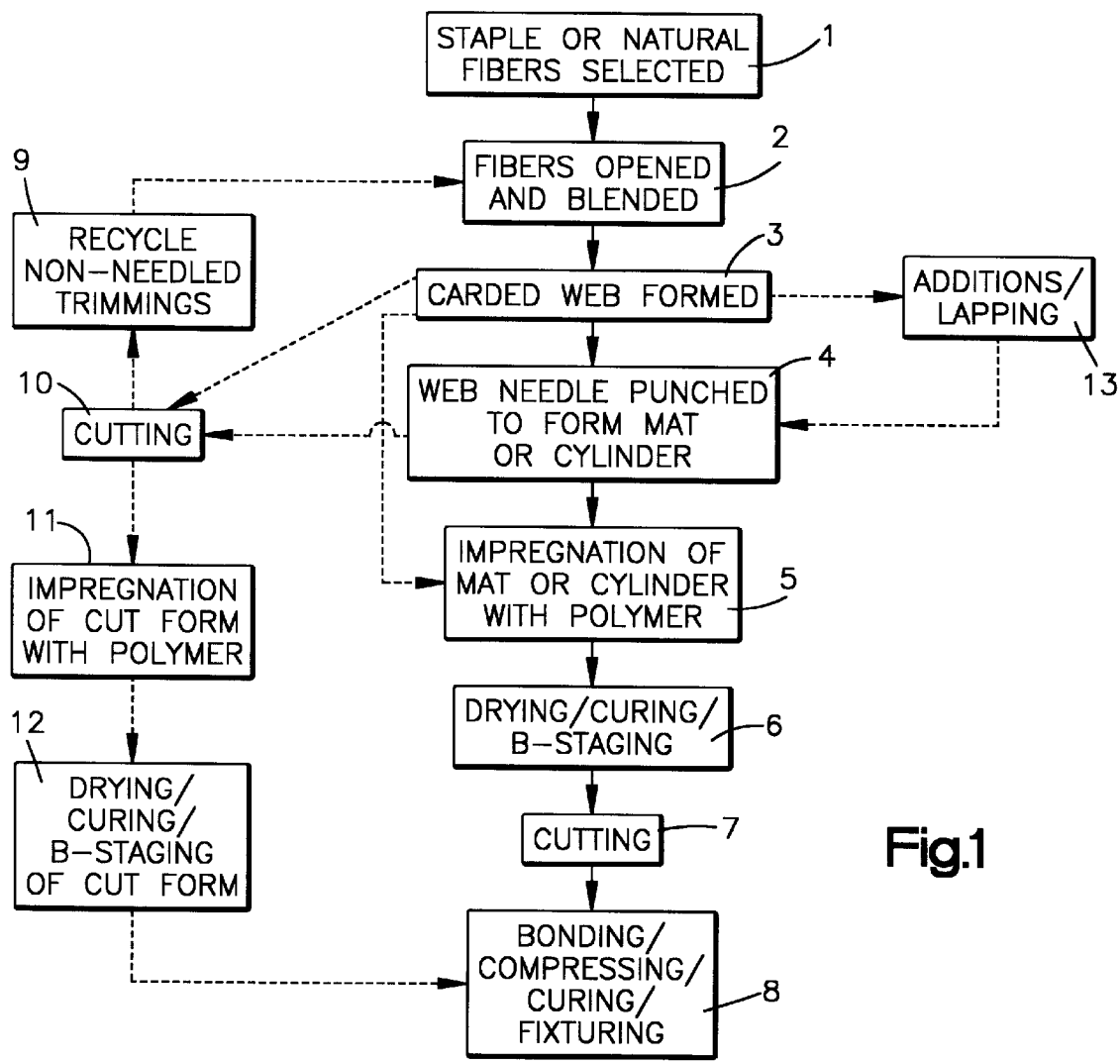
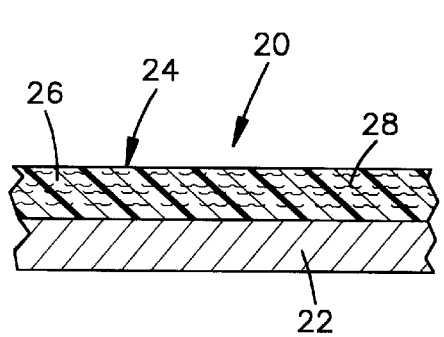
Fig.2
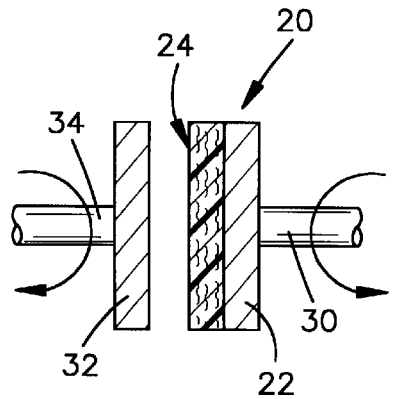
Fig.3

FRICTION CONTROLLING DEVICES AND METHODS OF THEIR MANUFACTURE

This is a division of application Ser. No. 08/210,072 filed Mar. 17, 1994, now abandoned, which is continuation of Ser. No. 07/691,672 filed Apr. 25, 1991, which is a continuation of Ser. No. 07/361,741, filed June 1, 1989, which is a continuation of Ser. No. 06/781,190, filed on Sep. 25, 1985, which is a continuation of Ser. No. 06/598,357, filed Apr. 11, 1984, which is a continuation of Ser. No. 06/105,893, filed Dec. 21, 1979.

BACKGROUND OF THE INVENTION

This invention relates to a category of fiber reinforced polymer (FRP) composite products and a common means of manufacturing them. Generally, it is a group of minimally abradable products in which operational coefficient(s) of friction is a significant function. Particularly, the engaging friction surfaces of these products are formed from interlocked multiple individual staple or natural length fibers and compounded with a polymer matrix. More specifically, these separable fibers are mechanically engaged by non-papermaking nonwoven textile industry methods into fibrous webs before being compounded with the polymers.

I term products which control, purposefully influence, or are dependent upon their operational coefficients of friction Friction Controlling Devices (FCD's). These include: (1) "Friction products"; those products in which coefficients of friction are maximized at minimum wear rates. That is, the retarding of relative movement between friction surfaces is the primary function of the product, as in the operation of friction brakes and clutches, transmission bands, friction bearings, and belts. Typical brakes and clutches of this nature are further illustrated in U.S. Pat. Nos. 2,733,797 and 2,733,798, but dry brakes and clutches are also included: (2) "Anti-friction products"; those products in which coefficients of friction and wear are minimized. That is, a necessary product function is to enhance relative movement between opposing surfaces, such as in journal, thrust or friction washers, bearing surfaces, bushings and other such products.

These FCD's are minimally abradable, i.e., they are wear resistant in their intended applications. That is, after an initial break in period of operation their observable wear over few short friction engagements is negligible. And in the case, such as wear plates, where the FCD must exhibit more wear than the opposing surface, it nevertheless exhibits minimal swear over extended use.

Although the divergent FCD's have generally been produced by separate means and often separate industries, it has been a little recognized fact that in spite of the opposing functions of retarding movement or enhancing it, often the main difference between friction and anti-friction materials is a small, but functionally significant, difference in coefficients of friction which can be effected by a change in the fiber, polymer matrix, or construction of a composite material. For instance, both aircraft brakes and high energy journal bearings, products of divergent functions, have been made from similar carbon or graphite fiber reinforced heat resistant polymer composites, but by different processes. The means for reducing these multiple processes to one which is more versatile and could effect the necessary composite chances would be immediately applicable to manufacturing the various products, would have obvious favorable economic advantages, and share a common friction technology.

It is an accepted concept that FRP composites perform well in FCD's. However, numerous problems have been associated in fabricating the composite materials with fibers and resins of high heat and wear resistance. Some of these problems and processes can be summarized as follows:

1. Resin saturation of wetlaid fibers and particles. This is sheet material such as that described in U.S. Pat. Nos. 3,270,846, 3,738,901, 3,554,860, and 4,045,608 and is made on papermaking equipment. After polymer impregnation (the matrix) and curing, it is, in fact, an FRP composite, although still called "paper". This resilient material is of a specific range of porosity (interconnected void volume), produces desirably high coefficients of friction in an oil environment and is used in practically all automotive power transmission clutches.

One problem with this composite is that the papermaking process has usually necessitated the use of cotton or other fibers which decompose under high heats of friction and/or the use of asbestos fibers, an undesirable fiber to use for environmental reasons. Total replacement of these fibers has not been accomplished in any commercially available brake/transmission paper to date. These problems are detailed in: U. S. Pat. Nos. 2,869,973, column 1, lines 43–54; U.S. Pat. No. 3,647,722, column 1, lines 53–67, column 2, lines 2–7; and U.S. Pat. No. 3,927,241, column 1, lines 21–29. In addition, wetlaid methods generally use large quantities of water.

This inventor's attempts to replace these fibers in the papermaking process with those of staple length Kevlar (trade mark of E.I. DuPont Co.) fibers resulted in an increased amount of water and higher shear rates being necessary than is normally employed in papermaking. However, the finished sheets exhibited excellent durability under energetic friction conditions, indicating the improvements possible by utilization of this type fiber if an appropriate method of sheet formation were found. Other investigators are attempting to form Kevlar sheet and structured materials by other than wetlaying or weaving, but their results are not yet known for application to FCD's.

2. Weaving or knitting of fibers with subsequent resin impregnation. This has been utilized in a number of bearing liner, friction clutch and brake processes, such as described in U.S. Pat. Nos. 3,730,320, 3,765,978, 4,020,226 and 4,0541,337. But, weaving and knitting are time consuming and expensive processes. In addition, if an annular shape FCD is desired, the woven or otherwise sheeted materials are generally cut into rings which result in high waste of centers and trimmings. Another problem with woven fabrics is the difficulty in producing sheets of varying thicknesses. Unique three dimensional weaving patterns difficult to repeatedly change are often needed for each thickness and fiber type.

3. Various flowable molding, bulk molding, and calendarinq compression techniques. These processes fail to obtain the interlocked fiber strength or strength of continuous length rovings inherent pith other processes. U.S. Pat. No. 2,553,215 is an example of how friction materials were molded before the advantage of interlocked fibers in papermaking was utilized. Bulk or particulate molding of organic materials, while applicable to some FCD's, cannot always be controlled to produce sufficient product integrity simultaneously with porosity and resilience. In addition, it has the basic limitation that the fibers and the matrix must form a good bond in order to function as a composite material. Also, tooling costs are high.

4. Spiral or helical winding or wrapping of continuous length fibers, woven cloths, or tapes with subsequent resin impregnation. Typical examples of these methods for friction and anti-friction applications are contained in U.S. Pat. Nos. 2,901,388, 3,639,197, 3,030,248, 2,953,418, 3,870,581 3,692,375 and 3,964,807. These methods improve the waste problem associated with cutting annuli from sheets, but they generally result in a tube of laminar character and do not provide a means of achieving interlocking fiber orientation in other than the peripheral direction. This can result in delamination of the wrappings, for instance, if a thin annular device of high porosity is produced and submitted to centrifugal forces. Also, as in the case of cylindrical thrust bearings, these weak lateral bonds between fiber loops lead to decreased compressive shear strength under axially oriented loads. In addition, helical winding of fiber tapes, continuous rovings, knitted bundles of fibers, or woven cloths is also relatively slow and expensive.

In the textile industry nonwoven cards, batts, mats, slivers, and webs are common terms for the fibrous matrix of this invention. This is the product of the nonwoven carding process that often replaces woven and wetlaid paper materials and is normally used in products such as disposable diapers and surgical garments, carpeting and carpet backing, shoe liners, compressive roll covers, and abrasive floor scrubbing pads. These nonwoven staple fibers commonly are airlaid by the Rando Web carding process (on machines supplied by Rando Machine Corp., Macedon, N.Y.) or formed on conventional carding machines such as those from Davis and Furber Machine Co., N. Andover, Mass., among others. U.S. Pat. No. 3,548,461, FIG. 1, illustrates a conventional type of carding machine and U.S. Pat. No. 2,451,915 describes an air-laying carding machine. The air laying system used herein and the types of products produced differ from the air flotation system employed in forming wholly fiberglas mats. Also, they are more versatile. Unlike other methods, most existing fibers can be card processed without the use of a liquid carrying medium and usually at a faster and less expensive rate. This substantially frees the FCD producer, rather than being limited to those fibers which can, for example, best be wetlaid, to choose those fibers which best perform in the product.

These webs are commonly needle punched (I term this reorienting) on machines such as those supplied by James Hunter machinery, N. Adams, Mass., and Oskar Dilo Kg Maschinenfabrik, Eberbach-N. West Germany. In needling of the flat sheet, a series of barbed needles are repeatedly penetrated through the carded Web normal to the plane of the web. This snags generally horizontally oriented fibers and reorientes them somewhat in the vertical direction, thereby interlocking the fibers into a tensibly stronger and integral mat. Other reorienting methods use jets of air or water, for example, that method described in U.S. Pat. No. 3,391,048. Hence, a ligated "nonwoven fabric" or "needled felt" is formed although weaving, knitting or actual felting methods are not used. An illustrative example of a needle loom is described in U.S. Pat. No. 3,117,359. By the Rontex carding and needle punching method (on the Oskar Dilo cylinder needling loom), the staple fibered web is wound on a mandrel and each helical layer is needled into the preceeding ones. These cylindrical forming methods are described in U.S. Pat. Nos. 3,508,307, 3,530,557, 3,540,096, 3,758,926 and 3,952,121. When an annular friction facing is prepared from the resulting cylinder by cutting perpendicularly to the cylinder's main axis a desired thickness of facing, two favorable characteristics are apparent. First, wound layers have predominently oriented the fibers in a circumferential (or peripheral) direction which presents the fibers in an optimum fashion for circumferentially directed friction forces. Second, the radially directed needled fibers diffuse the distinctive layers and further entangle and entwine the fibers into a stronger structure.

Another method of achieving the results of needling and introducing additional fibers to mat or tubular forms is that of fiber injection, for example, the methods described in U.S. Pat. No. 3,615,967.

Resin impregnation of nonwovens is known practice to the industry, for example, see U.S. Pat. Nos. 3,953,269, 3,819,465, 3,776,779 and 4,090,986. However, resin impregnation of nonwovens with heat and friction resistant plastics and elastomers is a relatively undeveloped area of the industry and in certain instances may require specially developed saturating equipment. One supplier of such equipment is Morrison Textile Machinery, Fort Lavin, S.C.

Although it is accepted that the interfiber strength produced by fine fibrils and hydrogen bonding in the wetlaid materials is not usually duplicated by that of these non-wetlaid materials, sufficient composite integrity for FCD purposes is achieved in my invention after polymer impregnation. In this way, a tradeoff of less, but adequate, sheet strength is more than compensated for in the final product by the broader and improved raw material options and versatility of products.

Another state-of-the-art attempt to induce interfiber entanglements is the technique of heat shrinking the fibers, similar to that of a felting process. This has been suggested In producing abrasion resistant "felts" as described in U.S. Pat. No. 2,910,763, but without resin impregnation. This process, however, limits the fiber types to those which are substantially heat retractable. Whereas my process, rather than retracting the fibers, reinforces them in a polymer matrix.

Also, it is common practice in nonwovens to utilize the technique of crosslapping. In this operation an auxiliary sheet or roving is overlayed in the width direction of a length-directed travelling web. This reciprocating folding across the machine direction from a fixed position along the machine direction gives the resulting laminar mat reinforcement in the cross direction. An example of this technique is described in U.S. Pat. No. 4,042,655. It is also used to produce by similar methods to mine, a non-related product, as is described in U.S. Pat. Nos. 3,067,482 and 3,067,483.

Crosslaps or other over or underlayments on a carded Fibrous form are also commonly made. These scrims, tows, mats, cloths, webs or other continuous length materials form supporting bonding or reinforcing substrates or co-layers for the carded web and may be woven or nonwoven.

Special consideration should be given to prior art involving polytetrafluoroethylene (also called "PTFE", "TFE", or TEFLON) fibers. It is generally accepted that these fibers cannot be bonded with adhesives and must be mechanically, usually by weaving, secured to other bondable fibers to adhere to a backing for use as a bearing material. Aforementioned state-of-the-art non-woven techniques have not, as well as can be determined by this inventor, been employed to entangle textile type staple length Teflon fibers into a bondable backing.

SUMMARY OF THE INVENTION

In accordance with the present invention, the process to produce FCD's can be described generally by the following series of operations which rely on many state-of-the-art procedures in the nonwoven textile industry, but which have been generally unknown in FCD manufacturing:

1. A selection of cut staple or natural length fibers of normal denier and length, the man-made fibers being about 1–7 denier and ⅛–3 inches (0.3–8 cm) in length, are opened and blended by mechanical or aerodynamic means.

2. The fibers are formed into a nonwoven carded web.

3. Either the web, a portion of the web (e.g. an annulus), and/or a tubular formation of the web is needle punched.

4. The product of either operation 2 above (with the elimination of 3 above), or, preferably, operation 3, is impregnated with a polymer resin, usually in solution, or gum.

5. On the product of 4 above, elimination of solvents or other liquids and/or curing is accomplished by: vacuum, heating, chemical reaction, or a combination thereof.

6. The product of 5 above is cut, compressed, and affixed to a supporting member, backing, or fixture, as is necessary.

Anticipated variations of this process include:

substituting or supplementing the needling operation with one of stitch bonding, adding particulate or powdered material to the composite at any stage of the operation, using a combination of woven and/or continuous length fibers in conjunction with the nonwoven web in the composite, for example, crosslapping or using the technique described in U.S. Pat. No. 3,736,211 to over or underlay the web, heating/curing by radio frequency, microwave, or convection, cutting of fiberous materials by the use of lasar beams, "sizing" of fibers to be more compatible with resins, adding of grooves to a product to facilitate lubricating oil flow.

Accordingly, it is an object of this invention to provide a process with the ability to produce a wear resistant friction influencing, friction inducing or friction dependent product having: (a) entangled individually separable staple length fibers of temperature resistance greater than 200° C., (b) a variable amount of porosity, (c) optional resilience, (d) variable coefficients of friction and (e) any of a variety of high-temperature resistant, friction-coefficient modifying, polymer matrices; without necessitating the use of wetlaid papermaking, weaving, or continuous fiber winding equipment.

Also, it is an object of this invention to achieve a, novel method of manufacturing numerous friction influencing, inducing or dependent products which have traditionally been manufactured by a number of unrelated means.

Another object is to provide a wear resistant control device with improved heat resistant resin, particularly by the aforementioned process.

Another object is to achieve a method of producing a nonwoven sheet of predominantly nonbondable or difficult-to-bond individually separable staple length fibers on one side and predominently bondable fibers on the other for the purpose of producing a friction influencing, friction inducing or friction dependent product.

Another object of this invention is to provide novel fiber reinforced polymer composite friction control devices of nonwoven drylaid fibers and polymeric resin; and more particularly to make such devices by the aforementioned process.

Another object is to produce a friction product with staple length Kevlar fibers without wetlaying, weaving, winding of continuous length fibers, or the use of bulk molding or calendaring compounds.

Another object is to devise a method of using individually separable staple length Teflon fibers in an anti-friction product without wetlaying, weaving, winding of continuous length fibers, or using said fibers in bulk molding or calendaring compounds.

Another object is to devise a process which lends itself to producing odd sized fiberous FCD's in small or large lots.

The nature of this invention will become better understood after examining the included figures, specifications, examples, prior art, and claims. However, the descriptions and examples are not to be taken as equivalents, producing equally performing products or products produced by equally preferable means. Nor are these procedures and descriptions limited to those described; other variations and procedures within the invention will occur to those skilled in the arts and are meant to be included herein.

BRIEF DESCRIPTION OF THE DRAWINGS

FIG. 1 is a schematic process diagram illustrating embodiments of the process. Solid lines follow the preferred embodiment, dotted lines modifications. The individual steps of the preferred embodiment are numbered consecutively 1–8. The modifying steps are numbered 9–13.

FIG. 2 is a diagramatic view of a friction control device embodying the present invention.

FIG. 3 is a diagrammatic view of another friction control device embodying the present invention and having relatively movable parts.

DETAILED DESCRIPTION

Referring now to FIG. 1, as indicated at step 1, the staple fibers are selected for their processabilities and service performances which generally are indicated by known chemical and mechanical properties. Staple fibers greater than ⅛ inch and preferably greater than 1 inch are more readily carded. For instance, tetrafluoroethylene, graphite, carbon fibers or low friction fibers will generally be utilized in anti-friction applications due to their inherent lubricity. So called "low friction fibers" are fibers composed essentially of materials generally characterized as exhibiting coefficients of dynamic friction under low load and velocity and opposing steel lower than approximately 0.2. However, lubricity or heat and chemical resistance of the fibers may be the same properties that furnish low wear in higher friction applications and therefore they may be used in such. Fibers of minerals, glass, asbestos, cotton and the types described in U.S. Pat. No. 4,002,592 will generally be included with other fibers for producing surfaces of higher coefficients of friction, but cannot be ruled out for inclusion in anti-friction materials, for instance, due to their lower prices and compatibility with some resins, When considering other necessary properties of the FCD, such as wear resistance, porosity, resilience and other mechanical or chemical characteristics in conjunction with operational environments of the product, such as exposure to oil, air, or water, it can be seen that fibers may be selected for other than their frictional properties.

Preferable fibers are those which when combined to form the carded web exhibit low wear and resist the heat produced by the particular friction application. Aramid fibers, particularly those of the poly (p-phenyleneterephthalamide) variety, such as Kevlar, have been found to be an improved type, especially for certain energetic applications such as high energy wet clutches. In these instances, the fibers are carded and preferably needled and impregnated with a heat resistant resin. Other heat and/or wear resistant fibers that may be employed include glass, mineral, metal, TFE, carbon, graphite, novoloid and polybenzimidazole. However, it is to be noted that webs containing exclusively abrasive type fibers such as wholly glass or mineral fibered mats or rovings do not exhibit sufficient wear resistance and are to be avoided. In addition, they exhibit wear on opposing metal surfaces and thus have not had commercial success in products such as clutch and bearing surfaces.

Use of less heat and/or less wear-resistant fibers such as polyester, polypropylene, or more preferably, cotton, and nylon and the like are applicable in less energetic conditions where heat and/or frictional forces do not exceed the properties of the composite.

As stated, the processing limitations on fibers by this process are relatively few. It should be noted though, that certain brittle fibers such as high modulus graphite and particular glass fibers may experience breakage during this process and might better be replaced by longer or more flexible types, for instance high tensile low modulus graphite and "soft" S-glass type fibers. In addition, a "carrier," or needlable non-carbonized or graphitized fiber type is to be included and, for example, in the case of the Rontex cylindrical needler, this carrier proportion is greater than approximately 20% by weight and is preferably greater than approximately 30% by weight of the total fibers used. Among the preferable fibers for needling are Nomex and Dacron (trade marks of I.E. DuPont Co.) although many others are common to the industry.

Other fiber choice considerations include fiber/resin and fiber/solvent compatabilities, specific lengths of blended different type fibers, fiber coatings ("sizings"), price, availability, special handling requirements and others known to those skilled in the arts.

At 2, the fibers are opened and blended. Man-made fibers are generally opened by agitation. This separation of bundles, such as those resulting from the chopping of a fiber tow or agglomerations due to static, may be accomplished by mechanical agitation or mixing the fibers in a stream of air. Cotton fibers employ special opening equipment known to the industry, whereas asbestos fibers would require particular dust controlling apparatus and handling.

If a homogenous blend of different fibers or fiber lengths is desired, mixing the fibers together, generally in conjunction with the opening process, is done. If a web with differing proportions of different fibers on each side is desired, blending the different fibers is not done. Various commercially available and in-house devices accomplish opening and blending and my process includes use of any suitable to the fibers of 1.

At 3 the fibers are carded. This may generally be described as passing the fibers through combing, working, doffing and/or "lickerin" rolls, removing them from the rolls by mechanical, centrifugal or aerodynamic force and depositing them on a condensing screen, endless belt, or cylinder so as to entangle the fibers into a web. The web so formed may weigh as little as approximately 15–150 GPSM (or 0.6–6 OPSY, i.e. grams per sq. meter or ounces per sq. yard, respectively), if it is of synthetic fibers to be used in multiple layers of a cylinder needling loom. Generally the flat mat is about 200–500 GPSM if it is to be used, for instance, at 30% by weight dry resin content and 50% porosity in a 1 mm thick clutch facing. Higher basis weights may be utilized for thicker, denser, lower proportioned resin content products or higher specific gravity fibers; these range approximately 500–800 GPSM. Basis weights of 1000–2000 GPSM are known for purposes such as in carpeting and with certain fibers and lapping of webs these may be practiced here.

At 4 the web is needled or reoriented into either a fla mat or around a mandrel into a cylinder, as previously described in the Background. The choice of either form is determined by product shape or preference.

The amount of needling in a unit area (needling density) is on the order of 600–6000 penetrations per square cm. in the mat form and generally a larger number in the tubular form. Needling densities are commonly adjusted with each type web to maximize interfiber entanglement as is needed in the product and minimize fiber breakage and distortion of the fabric. This is accomplished by adjusting the needle population on the supporting needle board and cycling through it the traveling web at variable speeds and at variable penetration rates. The needle types are individually determined to fiber types and operating rates to minimize needle breakage.

At 5 preferably a saturating polymer resin binder or blend of resins solution, or foam, spray, or suspension is selected and impregnated into the product of 4 above, coating the fibers and adhering in the interstices of the fiber form with a viscous fluid carrying plastic or elastomeric matter which remains intact with the fiber structure upon subsequent curing and/or drying.

Alternatively, a mat at 5 is impregnated with a millable elastomer by roller milling the mat and elastomeric gum and curing agent together to form the uncured sheet. However, this necessarily results in a low porosity material; its advantage over other calendaring FRP compounds is that the fiber mat has integral strength and shape prior to impregnation and is not an amorphous mass of non-interlocked fibers in which composite mechanical properties are so related to the fiber to matrix bond.

Also, solid resin particles may be dispersed among the fibers at 5 and caused to fuse into the matrix subsequently at 6 or 8.

In either case, the impregnated matrix is chosen for friction and wear properties, processability and cost. The polymers are processed with suitable solvents or additives and catalysts according to the manufacturer's published recommendations and known techniques.

Polymer binders that resist heats of friction or generally exhibit retention of mechanical properties at temperatures greater than approximately 200° C. (so called "heat resistant resins") are preferably used at 5. Therefore, polymers such as phenolics, polyethersulfone, polyarylsulfone, polysulfone, polyphenylsulfone, polyimide, poly-(amide-imide), polyphenylene sulfide, polyphenylquinoxaline, certain polybutadiene copolymers and flurosilicones are particularly suitable, but generally lesser heat resistant polymers such as epoxies, polybutalene terephthalates and the like are also suitable where less temperature resistance is acceptable.

At 6 the product of 5 is converted to a handleable dry state by evaporation of solvents and/or chemical reaction. This is accomplished through the use of such means as heating ovens, heated pressure molds, exposure to radio, infrared, UV, or micro waves, vacuum reaction catalysts in the polymer, heated nip rolls, passing the mat over heated cans, and other means known in the arts, However, in the case of thermosetting resins, this operation is specifically limited as to the amount of heat and chemical reaction used so as to produce a handleable dry material which is not fully polymerized. This so called "B-staging" is commonly practiced. Full polymerization, or curing, is preferably reserved for later activation after the material is in the final product configuration.

At 7 the dried composite from 6 is cut to the general FCD configuration. Alternatively, it is cut into a molding preform, for instance, as is described in U.S. Pat. No. 3,328,100.

The cutting is accomplished on flat mats by stamping with devices such as steel rule dies, or, as in the case of slicing cylinders perpendicular to their longitudinal axes, cutting can be done with frequently sharpened devices common to the textile industry, such as Rotoshere from H. Maimin Co., New York, N.Y., or cutters from Eastman Machine, Buffalo, N.Y. FRP cylinders can also be machined or abraded to proper diameters. Alternatively, cutting with lasar beams is accomplished.

At 8 the cut and dried form is fabricated into the final part and if not already accomplished, the polymer is fully cured or polymerized. This is preferably effected by heat-compressing the FRP to a predetermined porosity or density such as under the heated platens of a press, mold or vacuum bag arrangement at temperatures and residence time coinciding with that necessary to cure the matrix and if desired, bond it to an adhesively coated supporting device or fixture, but this may also be accomplished by full exposure to the required heat without compression. Also adhesive may be applied to one or more sides of the composite and bonded to the support.

Some FCD's, such as some friction washers, will be final products at the completion of operation 7. These devices need not be bonded, cured, compressed, or fixtured, as at 8. Other products, such as those with slow curing reactions, as in the case of polyimide-containing products, may be subjected to a long post-curing heating, as in an oven.

Some modifications of this process constitute other embodiments of this invention. In FIG. 1, proceeding from 3 directly to 5 indicates eliminating the needling operation entirely and results in a flat fibrous web of loose, but integral, structure. This is applicable to nonporous products in which the path of friction is incrementally short, such as the static friction condition experienced by a washer with opposing surfaces in normally fixed positions and under light load. The particular product may not need the additional tensile strength or fiber density provided by needling. Here the integral strength of the carded web without needling provides sufficient reinforcement for the product while the raw material utilization capabilities of carding are realized. Resin saturation of this web is accomplished on a double screen saturator.

Also, in producing non-needled composites, if it is desired to cut a shape from the flat web that might result in substantial waste trimmings, by following step 3 directly to step 10 in FIG. 1, the non-needled homogeneous web can be cut to product configuration with the trimmings conveniently returned to the opening/blending stage at 2. This cut form is then resin saturated at 11 (as in 5, previously), dried and/or cured at 12 (as at 6, previously) and promoted to step 8.

Alternatively to the foregoing, the web from 3 is needled at 4 and cut at 10 before resin impregnation at 11 of only the needled and cut form. This conserves saturating resins. However, if needled trimmings are attempted to be reclaimed, special shredding and opening equipment may be required. An example of this type equipment is described in U.S. Pat. No. 3,941,530.

Additional embodiments of this invention are indicated by the inclusion of step 13. This introduces additional ingredients between the needling operations of 3 and 4. By crosslappinq, laminating or dispersing particulate, powder, or additional fibrous materials on the carded web before needling and cylinder formation at 4 or 5, non- or difficultly-carded materials can be uniformly distributed or laminated in the fibrous structure. If the addition to a cylinder is in the form of crosslapped continuous length fibers, tube tensile strength in the axial direction is improved through orientation of the added fibers in that direction. Or, if the addition is in the form of a second lapped web of different composition, the resultant needled laminate mat is a sheet with different proportions of fibers on either side. This overlappinq of webs is further described in U.S. Pat. No. 3,940,216, and 3,528,059 for example. Other properties such as tensile strength, can be affected by addition of continuous length fibers, tows, woven fabrics, cloths or scrims. In any case of additional non-carded materials, it is intended that at least the functional part of the friction surface remain carded and nonwoven.

When non-fibrous particled materials (i.e., those segmented materials in which mean length does not exceed approximately three times mean width) are used in step 13, these powders and/or granuled materials are dispersed on or coformed with the carded web in proportions less than approximately 50% by weight and preferably less than approximately 40% by weight of the resulting combination of fibers and non-fibers. The particles may be nonfunctional fillers or functional particles such as graphite or molybdenum disullfide friction reducers. When co-formed with the fibers, the non-fibers populate the interstices of the final composite and may contribute the desired bulk, cost effectiveness, heat resistance, mechanical or frictional properties.

A product of this invention can be described as having the intended function of influencing the dynamic and/or static coefficients of friction under intended operational conditions between a friction influencing facing of itself and an opposing friction surface. Rather than displacing or removing of constituent materials of, or between, the two surfaces, other than lubricating layers, the product intention is to elastically encounter—not shear—surface asperities so as to maximize or minimize a retarding force of relative motion therebetween while minimizing wear of the surfaces. This is not to state that wear or displacement of surface constituent materials does not inadvertently result, but that the product, by the nature of its intended use, minimizes this. Thus, wear for any few normal frictional engagements after an initial break-in period is less than can be measured by regular means and is considered negligible. Porous, resilient friction inducing products, for example, fiber polymer composite clutch facings for operation in a lubricated environment, require construction of the composite to greater than approximately 30% by volume and preferably greater than approximately 50% by volume void space. My process achieves products such as this most readily. Additionally it offers these products with a wider selection of processable fibers and polymer matrices to achieve favorably close ratioed and high coefficients of static and dynamic friction, minimal wear and resilience.

Therefore, a product of this process, modifications of the process, or any intermittent phase of this process should not be confused with any product designed for abrasively or otherwise frictionally wearing of either aforementioned surfaces. Neither should it be confused with products or materials intended to buff, shine, or otherwise frictionally condition an opposing surface, although this nay result besides its intended use.

In addition, the physical nature of the constituent composite used to form the friction surface of the intended products of this invention may be characterized as being a nonwoven integral carded form containing greater than approximately 20% by weight individually initially separable, flexible, non-abrasive staple length fibers greater than approximately ⅛ inch in length or naturally occurring fibers in a polymer plastic or elastic matrix; these fibers being of the naturally occurring or synthetically spun or drawn variety, non-carbonized or non-graphitized and not formed in situ of said form. The matrix partially or entirely filling the intersices of the integral fibrous form and cured, deposited or solidified from solution in situ, bonds to, enjoins and interfaces with, but is not regarded as, said fibers.

The process of the invention initially forms an integral carded web from a mass of opened and blended said fibers especially chosen for their desired frictional, chemical, physical and/or processing qualities by combing, working with a lickerin type device, stripping, doffing, air delivering, or otherwise mechanically but not hydrodynamically, laying or depositing said fibers on a screen, belt, apron, cylinder, condenser, or other accumulating surface.

Preferably, the said carrier fibers greater than approximately 20% by weight of the carded web are caused to further intermingle, interlock, entwine, entangle and ligate by needling or otherwise reorienting said fibers in directions other than those resulting from said previous carding. Following carding and needling, or after carding if needling is to be eliminated from said process, the fibrous form is impregnated, saturated, sprayed, roller-applied or otherwise compounded with an organic polymer material in solution, suspension, or gum. The impregnated fibrous form is dried to a handleable processable state, if not already in that condition and cut, stamped, machined or otherwise formed into said desired friction influencing product, a fabricating or a molding shape. Said molding shape or preform differs from conventional bulk molding compounds and preforms in that the fibrous form has integral shape without weaving or knitting and independent of said polymers and is not to be confused with said molding compounds or woven or knitted preforms. The uniform intra-supportive network of fibers provided by the integral carded web, therefore, lends considerable advantage over previously employed molded or calendered compounds.

Confusion should also be avoided between said fibrous form and those produced by the rubbing of a felting process, or heat or chemical retraction of fibers. Any specially designed combination of high proportions of heat retractable fibers and sufficient heat or shrinking solvents to effect a high degree of shrinkage of the fibers is to be avoided.

To the resultant composite, the subsequent operations of fixturing, bonding, molding or compressing to a backing, supporting or adjoining member and further curing said polymeric material, if not already fully cured, are executed to conform with said friction influencing product design and the nature of said polymer.

The optional operations of recycling fibers not used in said product and/or the adding of additional ingredients to said product by dispersing or overlapping on the fibrous web between said carding and needling operations is to be exercised as is convenient to cost efficiency and desired properties of said product.

EXAMPLE I

A blend of 45% by weight 1.5 denier 2" Nonex and 35% 1.5" Kevlar 29 fibers (both crimped, of E. I. DuPont de Nemours & Co., Wilmington, Del.) and 20% Fortafil 3 staple graphite fibers (Great Lakes Carbon Corp., New York, N.Y.) are opened, blended and carded by conventional means into a web of approximately 1–5 OPSY basis weight. This web is processed into a hollow cylinder by the Rontex method on any Oskar Dilo cylinder needling loom. The dimensions can generally be within 3 to 20 inches in outside diameter, ¾ inch wall thickness, any length and approximately 0.001 inch tolerance. In this case, approximately 6" O.D., 5" I.D. and nonspecific length greater than 6" is chosen. Production speeds in this case produce approximately 1–3 linear feet of cylinder per minute.

The tube is then submerged in a solution of Arofene 295-E-50 phenolic resin (Ashland Chemical, Columbus, Ohio) which is diluted to result in approximately 30% by weight dry resin solids in the final friction material. Many other resins can be used also. Then the tube is dried and semi-cured at temperatures below 300° F. and minimum tile to effect solvent removal, as is known in the art. The handleably dry tube is sliced perpendicular to its longitudinal axis into annular friction facings for use in a wet lubricant environment as clutches or brakes.

Two of the annular facings are bonded so as to effect a final facing porosity of approximately 60% by volume to opposite sides of a metal plate designed for the purpose.

The resultant wet clutch or brake facing exhibits fiber orientation substantially in directions concentric with the annulus and in the plane of the facing surface. But, unlike other mandrel wound structures, the greater than approximately 20% by weight needlable fibers furnish sufficient fibers oriented at angles to the periphery and reinforce the otherwise concentric and laminar character of the facing. This immediately realizes several optimum conditions: The fibers are substantially oriented in the service direction of friction (i.e., peripherally). The maximum pull-out strength of the fiber in its matrix is thus theoretically approached. An optimum surface area of fiber rather than resin is presented to the friction surface. Due to the fact that no poorly heat resistant fibers, such as cotton, are used, this friction material can be operated at low wear in high friction energy applications.

Surface cooling of the friction material can be improved by the addition of embossed or machined grooves in the surface, but is not necessary to effect favorable friction-maximizing operation.

In this example the consecutive steps 1–8 of FIG. 1 have been followed for the production of a clutch/brake friction plate and tested successfully as such. The friction material was resilient, it exhibited sponge-like porosity in oil, normal coefficients of friction for this application exceeding 0.1 dynamic coefficient and favorably close ratioed to static coefficients and did not rely on aforementioned objectionable apparatus, raw materials or procedures to be avoided in its manufacture. Neither was it found that the opposing friction surface need be finely finished to avoid rapid wear as with normal friction(on papers.

Thus, a unique friction influencing, friction rendering product is produced by this improved method.

EXAMPLE II

A friction product is produced by carding/needling procedures of Example I with the exceptions that the fiber blend is chrysotile asbestos fibers, opened cotton fibers, both of naturally occurring length, and 2 inch, 1.5 denier Nomex, in a 1:1:1 weight ratio.

The desired friction facing is 8" O.D., 5" I.D. Since the Rontex method does not conveniently needle cylinders with 1.5" thick stalls, a unique solution is applied. Two different size cylinders are prepared, one with 6.5" I.D. and 8" O.D. (+0.030", –0") and a second with 6.5" O.D. and 5" I.D. The two needled cylinders are placed concentrically and processed through impregnation, slicing and fixturing as before. The resin between the cylinders forms sufficient bonding that the thin sliced facings can be carefully bonded to metal plates while maintaining their concentric positions. Thus, odd sized small lots can be readily produced by appropriately cutting and concentrically assembling prestocked cylinders of various dimensions.

It is immediately apparent that manufacturers of wet clutch and brake plates can buy or produce and stock several basic sized fibrous cylinders to be used in any close fitting concentric arrangement desired. The saturated and dried concentric cylinders would then either be machined to proper I.D. and O.D., the sliced rings stamped to proper diameters, or the excess material trimmed after being bonded to the plate.

The ever frequent small orders for different sized fibrous friction plates that are often rejected by larger manufacturers due to initial set-up costs associated with different sizes, materials, porosities, etc. could be custom processed in this way.

This example also constitutes following the steps 1–8 of FIG. 1 consecutively. The concentric arrangement of product from step 4 is regarded and processed as in the previous descriptions of singular cylinders.

EXAMPLES III and IV

A blend of 80% by weight Kevlar and 20% Thornel carbon staple fibers (Union Carbide Corp., New York, N.Y.) are carded into an airlaid web by the Rando process. The basis weight of the web is calculated based on: the specific gravities of the individual constituents of the final composite, their proportions, the desired void space and the dimensions of the final product.

A mat of approximately 12 OPSY basis weight is needled by normal methods with sufficiently heavy barbed needles at a density of approximately 50–300 penetrations per square inch.

For Example III, the mat is then cut into the desired annuli for the purpose of manufacturing the clutch/brake product of Examples I or II. The annuli rather than whole webs are impregnated with like resin and dried as the materials in Examples I and II. Then they are bonded to metal plates as before. This constitutes following the sequence of operations of FIG. 1 of: 1, 2, 3, 4, 10, 11, 12, 8.

For Example IV, the entire mat rather than just the annuli is resin impregnated, which constitutes the sequence of steps 1–8.

The fiber orientation in the friction facings of these two Examples III and IV is more random, but favorably ratioed and high coefficients of friction comparable to results of the product test of Example I were obtained following either of these sequence of operations.

EXAMPLE V

A fiber cylinder composed of 50% by weight Teflon fibers (DuPont Co.) and 50% Nomex is formed according to the sequential steps 1–4 of FIG. 1. The intended product having a low coefficient of friction and exhibiting low wear is a readily produced journal bearing allowing rotary motion along its inside periphery and having an outside peripheral metal supporting sleeve to which the FRP is bonded.

The excessive length cylinder is saturated in a resin solution diluted so as to effect a minimally adequate amount of dried resin in the product to accomplish necessary densification under heat and compression while presenting a maximum amount of fiber to the friction surface. A B-stageable resin such as the epoxy Epon 828 with Epon Curing Agent Z (Shell Chemical Co., Oak Brook, Ill.), or various polyester, polyimide or phenolic resins may be employed. Alternatively to B-stageable resins, a fully polymerized high-temperature resistant thermoplastic such as polyethersulfone (IGI United States, Inc., Wilmington, Del.) soluble in DMF solvent can be employed in a like manner. The cylinder is B-staged, or, as in the case of the thermoplastic, simply dried, whichever the case may be, as at 6.

At 7, an appropriate length of cylinder to be processed as follows and resulting in the desired journal length is cut.

For step 8, the cut preform is molded and cured generally as is described in U.S. Pat. No. 3,964,807; the cylinder is used as would a normal molding compound, but maintaining its integral shape. However, unlike the process in said patent, a cylindrical metal sleeve supporting member of outside diameter and length conforming to the inner cylindrical wall of the mold cavity and inside diameter of the sleeve generally conforming to the outside diameter of the tubular composite is concentrically inserted in the mold cavity followed by placing the tubular composite in the mold concentric to the sleeve and then molding. Sufficient axially directed mold pressure, along with adequate heat and residence time, cause the FRP to axially compress and radially expand, effecting the desired densification, curing and bonding to the sleeve.

Due to the fact that the Teflon and Nomex fibers are interlocked, the non-bonding character of the Teflon/matrix interface does not lead to disintegration of the product that might be experienced if Teflon staple fibers were simply used as other fibers to refinforce a polymer matrix. This mechanical bonding of Teflon fibers to other bondable fibers is the basic principle employed in FRP materials using Teflon fibers. However, as in this example, the interlocking caused by needle punching more readily accomplishes this phenomenon than previous known methods of weaving, fiber compounding, heat shrinking, or simultaneously helically wrapping Teflon and bondable fibers.

EXAMPLE VI

The procedures of Example V are followed, but eliminating the metal sleeve insert and molding only the composite material. The final product of appropriate dimensions is fixtured for use as a loom picker, as described in U.S. Pat. No. 3,000,076. This anti-friction influencing product allows axial movement along its inside periphery.

EXAMPLE VII

A fiber cylinder of approximately 60% by weight Teflon, 20% cotton and 20% nylon 6/6 fibers are prepared into a fiber cylinder as in the steps 1–4 of Example V. The tube is then cut to length, impregnated with "Delrin" 500 and/or "Delrin" AF resins (DuPont Co.) to dry resin proportions to effect a resilient and bondable backing and a resin-scarce facing. it is dried in accordance with steps 10, 11 and 12 of FIG. 1 and the resin manufacturer's published recommendations. The tubular preform is used as a molding preform for producing a vehicle suspension system control arm bushing, for instance, as is further described and illustrated in U.S. Pat. No. 3,097,060, 14 of FIG. 1, or 24 of FIG. 2. Step 8 of this example is accomplished by following the simultaneous operations of transfer molding, heat curing and bonding to a metal fixture as described in said patent for producing this friction influencing device.

EXAMPLE VIII

A double lickerin carding machine, for instance, as is further described in U.S. Pat. Nos. 3,768,118, 3,772,739, 3,914,322, and 3,963,392, is used to produce a web with different types of fibers predominating on each side of the web. In this case, on one side cotton, Nomex or other bondable fibers are laid and on the other, predominently Teflon fibers.

The web is needle punched in mat form, impregnated, dried, cut and bonded to an appropriate metal substrate for use as a bearing liner sheet which is bonded on the predominently non-Teflon bondable side. For example, it can be cut and molded like the preforms in FIG. 8, U.S. Pat. No. 3,328,100 for producing ball joints.

As in Example VII, the resin proportion is meant to securely bond and matrix the bonding side, but allow a maximum of Teflon fibers to be presented at the friction surface. An adhesive binder is blotter-applied on the bondable side for bonding to the support although migration of the liquid may cause some binder to be present on other than the bondable surface of the final product. The resin type can be epoxy, phenolic, acetal, or other adherent thermosetting or high melting temperature thermoplastics.

EXAMPLE IX

An anti-friction device is prepared in accordance with Example VIII by substituting Teflon Fibers for aramid fibers.

EXAMPLE X

Two separately carded webs, one of Teflon fibers, the other of bondable fibers, for instance those of Example VIII, are multiple lapped, such as by the technique described in U.S. Pat. No. 3,940,216. The two webs are needle punched on both sides by multiple passes through a needle loom equipped with appropriate needles so as to maximize bonding between the two webs while maintaining minimum fiber breakage and mat distortion.

The mat, further impregnated, cut and bonded as described in Example VIII, can be used for any anti-friction surface of appropriate load, speed and opposing surface.

EXAMPLE XI

A needled carded fiber cylinder of approximately 30% by weight Nomex, 35% carbon or graphite fibers and 35% S-glass fibers (Dow Corning, Midland, Mich.), is impregnated to finally effect approximately 50% by weight dry resin solids of a polysiliconeimide as described in U.S. Pat. No. 4,051,163, Example I. The cylinder is cut into annular rings and bonded under sufficient heat to semi-cure and pressure to bring to maximum density on annular metal discs to be used as dry disk brakes. Following bonding the brake discs are further cured in an oven for sufficient time and at sufficient temperature to fully polymerize the matrix.

EXAMPLE XII

A needled cylinder of essentially Nomex is impregnated with a heat-resistant elastomer such as an RTV silicone (Dow Corning, Midland, Mich.), to minimum porosity, cured and cut into anti-friction Chevron type packing rings ("V" rings) for use as a sealing bearing such as is employed in U.S. Pat. No. 2,885,246 (column 3, lines 60–65).

The cylinder could also be cut or machined into thrust washers or the like.

EXAMPLE XIII

The cylinder of Example XII is prepared, but saturated and cured with a reacting mixture of polyurethane resin components (such as from Mobay Chemical, Pittsburgh, Pa.) instead of the heat-resistant elastomer. The high coefficient of friction and elasticity exhibited by this type resin enables the impregnated cylinder to be used or cut into annuli to be used as a friction washer to retard relative movement between opposing surfaces.

Alternatively, as another example the resin type and saturation is as practiced in U.S. Pat. No. 3,067,432, Example 1.

EXAMPLE XIV

A fibrous cylinder is prepared of essentially Dacron or Nomex fibers. It is impregnated and cured with a solution or acrylonitrile butadiene such as Hycar 1042 (B.F. Gooodrich, Cleveland, Ohio). This tube is cut to appropriate length to be used as a non-slip washer.

EXAMPLE XV

A blend of 30% Nomex, and 70% by weight Kevlar fibers is carded into a web. Between the web and needling operations, as is indicated at 13, in FIG. 1, lubricating particles of graphite flakes or molybdenum disulfide are dispersed evenly across the web to effect, for example, 40% by weight of the dry web. The web proceeds to the Rontex machine and is needled into a cylinder resulting in the lubricating particles being dispersed throughout.

The needled fiber tube is impregnated with an appropriate amount of epoxy or phenolic resin and the cut annuli compressed to effect a desirable density ranging from porous and resilient to hard and dense, with the product being used as ring and thrust washers of low friction due to the particles.

Alternatively, as other examples, particles of solid resin rather than only graphite and molybdinum disulfide as above are dispersed across the web. Difficult to dissolve particles such as polyphenylene sulfide, poly (amide-imide), polyphenylquinoxaline and polyimide are dispersed and caused to at least partially fuse into an intrasupportive matrix subsequently at 6 or 8 of FIG. 1.

EXAMPLE XVI

A 10 OPSY carded web consisting of 20% by weight graphite fibers, 30% Kynol (American Kynol Corp., New York, N.Y.) fibers, and 50% Kevlar, all capable of resisting the momentary heat of friction in excess of 200° C., is needle punched as in Example III. The mat is impregnated with a tung oil modified novolac phenolic resin to effect 28% by weight dry resin solids and dried and compressed to 65% void space. The mat to be used in producing automatic transmission bands is cut into thin strips of dimensions corresponding to the friction facing of the band and is bonded therewith. The product is used for its high coefficient of friction and heat and wear resistance.

EXAMPLE XVII

A non-needled cotton card of approximately 5 OPSY is saturation impregnated with an RTV silicone elastomer or impregnated by calendering the fiber web between two layers of millable gum stock, such as a Silastic based material (Dow Corning) and submitting the subsequent product to the manufacturer's recommended post-curing.

The resultant cut sheet serves as a low coefficient nonstick washer in limited abrasion applications, such as where the friction surfaces are normally static.

In this example, the steps 1–8 of FIG. 1 are followed consecutively, but eliminating 4 to produce this friction influencing type FCD.

Other examples of FCD's employ the same fibrous forms and product types indicated in Examples I, III, IV, V, VI, IX, XV, and XVI, but impregnate the fibers in solutions of heat resistant resins such as polyethersulfone, polyarylsulfone, polysulfone, polyphenysulfone and/or polyimide. Additionally, the fiber lengths, grades, proportions and needling densities of the examples may be altered to produce the same product types of similar properties. Resins may be blended. Resins and fabrication techniques of the examples may also be interchanged. Identical composites from one example may be applied to the product types of another.

It is immediately apparent that the divergence between friction and anti-friction products depends mainly on a gradation or the same phenomena and the environment in which it occurs, parameters which can be met by this same new art.

My method of producing friction dependent, friction rendering and friction influencing wear resistant devices is unique in that neither bulk molding compounds, woven fabrics, helical or spiral winding or wrapping of continuous length fibers or tapes, papermaking or wetlaying equipment, or heat shrinking of fibers is required. Yet, sufficiently strong FRP composites are produced with favorable friction coefficients, low wear, porosity or density, resilience or rigidity, heat and chemical resistance. A large variety of different types of products heretofore produced in several industries and by widely differing techniques and equipment can now be efficiently produced through a process common to them all in large or small volumes and variable sizes and shapes with minimum tooling for each type product, size or material.

When compared to helical winding of continuous lengths, weaving, or twisting of compound fibers, my process can be cost effective; to papermaking these devices, it is more versatile in fiber composition with the option of forming cylinders while reducing waste trimmings and water consumption and disposal. In considering the well established problem of adhering Teflon or Kevlar fibers in a matrix, this process presents the alternative approach of mechanically bonding the fibers to other fibers by needle punching. Also, it presents a unique way of producing a sheet composite with different fibers on either side.

By way of illustration, a friction control device 20 construced in accordance with this invention is show in FIG. 2, comprising a backing plate 22 of metal or the like attached to a bondable surface of a friction controlling layer 24 comprised of a drylaid carded nonwoven fibrous mat impregnated with a polymeric resin 28. The layer 24 is adhered by a suitable adhesive included on the layer 24, or applied to the plate 22. It will be understood that the shape, density, composition, direction of fiber alignment, and porosity of the material comprising the layer 24 and the shape and material of the support 22 can vary depending upon the intended use of the device. For example, the layer 24 may comprise heat resistant resins, particled materials, fibers other than carded staple types, and the fibers may be positioned in a random or aligned order. Also, the support 22 can be in the form of an annulus, a cylinder or other suitable contour. Where low friction characteristics are desired in the device 20, fibers of low coefficients of friction predominantly populate the exposed surface of the layer 24 and bondable fibers predominate the surface against the plate 22.

As illustrated in FIG. 3, the device 20 is part of an assembly, and is supported for rotation and reciprocation by a shaft 30, and is opposed to a plate 32, which is supported by a shaft 34 axially aligned with the shaft 30 for rotation relative to the device 20. The composite layer 24 in the device of FIG. 3 induces high and favorably ratioed coefficients of friction in service, is wear resistant, and the device 20 and plate 32 serve as a wet clutch or brake to retard relative movement upon frictional engagement between the layer 24 and the plate 32.

The disclosures of all above-identified patents are incorporated herein by reference.

While preferred embodiments of the invention have been described in detail, various modifications and alterations may be made therein without departing from the spirit and scope of the invention set forth in the appended claims.

What is claimed is:

1. A process of making a friction clutch facing or brake lining that effectively resists frictional heat and wear of a friction clutch or brake mechanism, comprising the steps of:
   a) selecting for their friction and wear properties staple aramid fibers and a heat resistant polymer resin to be co-formed into a fiber reinforced polymer composite having friction and wear properties suitable for use as a friction clutch facing or brake mechanism lining,
   b) opening, blending and drylay carding said fibers to form a nonwoven batt, mat, or web fibrous form,
   c) needle punching said fibrous form to produce an integrally stronger structure; and
   d) forming a fiber reinforced polymer composite by impregnating at least part of the integrally stronger structure with a polymer resin to result in greater than 20% by weight fibrous material in the composite when dry,
   e) said steps comprising the manufacture of a clutch facing or brake lining.

2. A process as set forth in claim 1 including the step of cutting a configuration of a clutch facing or brake lining from said composite and positioning the facing or lining for engagement with a relatively movable member of a clutch or brake mechanism, said facing or lining exhibiting a sufficiently high coefficient of friction to effectively retard relative movement between the facing or lining and said member.

3. An improved process of producing a fibrous porous resilient friction clutch facing or brake lining that effectively resists frictional heat and wear of a clutch or brake mechanism, comprising the steps of:
   a) selecting for their friction and wear properties staple length aramid fibers and a heat resistant polymer resin for co-forming into a final fiber reinforced polymer composite exhibiting low wear and high coefficients of static and dynamic friction;
   b) drylay carding said staple length fibers to form a nonwoven batt, mat, or web fibrous form;
   c) needle punching said fibrous form to produce an integrally stronger structure;
   d) impregnating said integrally stronger structure with the polymer resin and bringing the resulting impregnated structure to a handleable dry state, the structure having greater than approximately 30% void volume; and
   e) bonding at least a portion of said impregnated and dry form to a support member of a clutch or brake mechanism.

4. A process as set forth in claim 3 wherein the heat resistant polymer resin is selected from the group consisting of phenolic and polyimide resins.

5. A process for forming a friction clutch facing or brake lining that effectively resists friction heat and wear of a clutch or brake mechanism, comprising the steps of:

a) selecting for their friction and wear properties staple length fibers from the group consisting of fluoropolymer, aramid and polybenzimidazole, and a polymer resin to be co-formed into a composite for low wear and suitable for use as a friction clutch facing or brake mechanism lining;

b) opening, blending and drylay carding said fibers to form a nonwoven batt, mat, or web fibrous form;

c) wrapping said fibrous form in successive overlapping layers around an axis to form a hollow cylinder;

d) needle punching said fibrous form transversely of the axis to produce an integrally stronger structure; and e) forming a heat and wear resistant reinforced polymer composite by impregnating the integrally stronger structure with said polymer resin;

f)) said steps comprising the manufacture of a clutch facing or brake lining.

6. The process as set forth in claim 5 including the step of cutting said fiber reinforced needlepunched polymer composite in a plane normal to said cylinder axis to form an annulus of determined thickness.

7. A process as set forth in claim 6 including the step of bonding at least part of the annulus to a supporting member to produce a friction controlling facing.

8. A process of making a friction clutch facing or brake lining that effectively resists frictional heat and wear of a friction clutch or brake mechanism, comprising the steps of:

a) selecting for their friction and wear properties separable natural fibers or staple fibers, which are noncarbonized and nongraphitized and heat and wear resistant, and a heat resistant polymer resin, to be co-formed into a fiber reinforced polymer composite having friction and wear properties suitable for use as a friction clutch facing or brake mechanism lining;

b) opening, blending, and drylay carding said fibers to form a nonwoven fibrous form;

c) needle punching the fibrous form to produce an integrally stronger structure, and d) impregnating the integrally stronger structure with the selected polymer resin to form a fiber reinforced polymer composite, the fibrous material being greater than 20% by weight of the composite when dry;

f)) said steps comprising the manufacture of a clutch facing or brake lining.

9. A process as set forth in claim 8 wherein the selected fibers are staple length para-aramid fibers.

10. A process as set forth in claim 8 further including the step of wrapping the fibrous form in successive overlapping layers around an axis to form a hollow cylinder.

* * * * *